United States Patent [19]

Hackl et al.

[11] Patent Number: 4,845,413
[45] Date of Patent: Jul. 4, 1989

[54] DEVICE FOR CONTROLLING THE FIELD CURRENT OF DC MOTORS

[75] Inventors: Franz Hackl, Martinsberg; Wolfgang Spitaler, Vienna; Franz Wohrer, Puchenau, all of Austria

[73] Assignee: Siemens Aktiengesellschaft, Berlin and Munich, Fed. Rep. of Germany

[21] Appl. No.: 163,263

[22] Filed: Mar. 2, 1988

Related U.S. Application Data

[63] Continuation-in-part of Ser. No. 19,873, Feb. 27, 1987, which is a continuation-in-part of Ser. No. 852,304, Apr. 15, 1986.

[30] Foreign Application Priority Data

Apr. 16, 1985 [AT] Austria ................................ 1145/85

[51] Int. Cl.$^4$ .............................................. H02P 7/14
[52] U.S. Cl. .................................. 388/802; 318/493; 388/805; 388/818
[58] Field of Search ............... 318/338, 493, 536, 405, 318/428

[56] References Cited

U.S. PATENT DOCUMENTS

| | | | |
|---|---|---|---|
| 3,358,204 | 12/1967 | Bradley | 318/331 |
| 3,749,204 | 7/1973 | Caputo | 318/331 X |
| 3,950,684 | 4/1976 | Peterson | 318/338 |
| 4,035,704 | 7/1977 | York | 318/358 |
| 4,037,144 | 7/1977 | Ohmae et al. | 318/338 |
| 4,079,301 | 3/1978 | Johnson | 318/338 |
| 4,099,111 | 7/1978 | Inaba et al. | 318/338 |
| 4,171,505 | 10/1979 | Shima et al. | 318/316 |
| 4,366,420 | 12/1982 | Omae et al. | 318/338 |
| 4,378,517 | 3/1983 | Morton et al. | 318/338 |
| 4,385,266 | 5/1983 | Sloan | 318/338 X |
| 4,484,117 | 11/1984 | Bose | 318/338 |
| 4,549,122 | 10/1985 | Berkopec et al. | 318/338 |
| 4,739,230 | 4/1988 | Sonobe et al. | 318/301 |
| 4,751,439 | 6/1988 | Buchwald et al. | 318/338 X |

FOREIGN PATENT DOCUMENTS

| | | |
|---|---|---|
| 371294 | 6/1983 | Austria . |
| 2303641 | 8/1974 | Fed. Rep. of Germany . |
| 58-86887 | 5/1983 | Japan . |
| 508308 | 5/1970 | Switzerland . |
| 2040085 | 8/1980 | United Kingdom . |

OTHER PUBLICATIONS

Vol. 8-9 Siemens-Energietechnik 3, 1981; pp. 269-272, Bachman & Engel.
Vol. 4 Siemens-Energietechnik 1, 1979, H. Elger.

Primary Examiner—Benjamin Dobeck
Attorney, Agent, or Firm—Kenyon & Kenyon

[57] ABSTRACT

A device for controlling the field current of a DC motor supplied from an AC network and which is operated beyond the normal speed of the DC motor in the higher speed range obtainable by weakening of the field of the DC motor, there being provided for the apportioning of the field current of the DC motor a phase angle control circuit which is operated depending on a control variable obtained from the respective measured speed of the DC motor by a function-forming device as a function of the speed, the function-forming device comprising a function memory which contains values of the control variable correlated to individual speed values stored in a matrix in tabulated form, the correlation of these values individually corresponding to the DC motor being established when the DC motor starts up for the first time, and where a constant dependence of the control variable on the speed is established either by a polygonal line obtained by linear interpolation from the value pairs stored in tabulated form or by a curve optimally approximated to these value pairs.

2 Claims, 1 Drawing Sheet

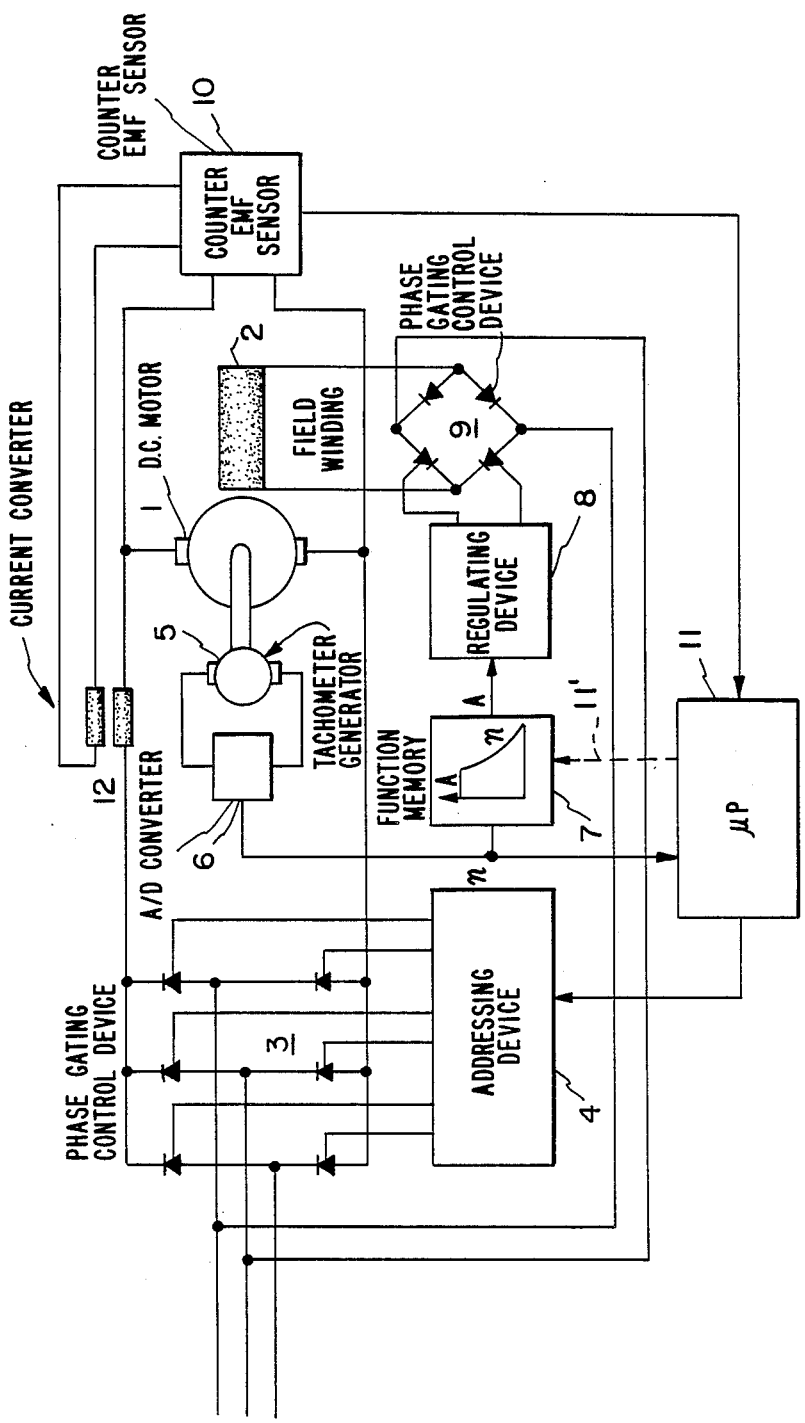

DEVICE FOR CONTROLLING THE FIELD CURRENT OF DC MOTORS

CROSS REFERENCE TO RELATED APPLICATIONS

This application is a continuation-in-part of copending U.S. patent application Ser. No. 019,873, filed Feb.27, 1987, which in turn is a continuation-in-part of U.S. patent application Ser. No. 852,304 filed Apr. 15, 1986.

BACKGROUND OF THE INVENTION

The subject of the present invention is a device for controlling the field current of DC motors which are operated beyond the normal rotational speed in the higher speed range attainable by weakening of the field, there being provided for the apportioning of the field current a phase angle control device which is operated in dependence on a control variable which is obtained from the measured speed by means of a function-forming device as a function (precontrol characteristic) of the rotational speed.

The typical DC motor consists in principle of two parts, a field magnet with a field winding which, when traversed by a field current, produces a stationary magnetic field, and a rotating armature. The armature has a plurality of windings which are connected to the terminals of the motor via a commutator and via brushes. Cooperating with the magnetic field produced by the current-carrying field winding, the current-carrying armature generates the forces that bring about the rotation of the armature. The commutator serves for successive current supply to the individual windings of the armature during rotation of the armature, and this in such a way that the direction of current flow in the respective windings of the armature remains in the same position relative to the poles of the field magnet circuit. By the rotation of the armature windings in the magnetic field there is produced in the armature, according to the law of induction, a countervoltage (EMF) which is opposed to the applied armature voltage.

In the stationary case of motor operation, exactly that rotational speed will occur at which the EMF induced in the armature is equal to the armature voltage reduced by the ohmic voltage drop caused by the current flow in the armature circuit. The relationship between the rotational speed n, the induced EMF, and the machine flux MF caused by the field current is represented by the well known basic formula of the DC machine resulting from the law of induction:

$$EMF = k\ MF\ n,$$

where k is a machine constant.

In principle, two operating ranges may be distinguished in the control of DC machines, namely a range in which the machine field is kept at the maximum value, the "nominal field", and the speed increase is achieved by increasing the armature voltage, and a second range, the so-called "field weakening range", in which to obtain higher speeds the machine field is weakened starting from the nominal field. It has been found to be desirable to weaken the exciting field in such a way that the EMF induced in the armature of the DC machine remains constant in the latter range, namely at the desired value ES.

As the armature voltage must remain limited to the rated armature voltage of the motor, when operating in the first range a limit speed is reached which is referred to as "base speed". The base speed corresponds to the speed at which, for maximum instantaneous load of the motor corresponding to the rated armature current and for rated armature voltage, the rated power is obtained; the then occurring EMF equals the desired value ES. The desired value ES thus results from the rated armature voltage minus the ohmic armature voltage drop at the rated armature current.

The power delivered at the shaft of the DC motor is (expressed in mechanical quantities) equal to the product of rotational speed and torque or respectively (expressed in electrical quantities) equal to the product of EMF and armature current.

If operation of the motor above the base speed is desired, it becomes necessary to weaken the field, as a further increase of the rated armature voltage after reaching the other maximum rated values of the motor is not permitted. Now if it is to be possible to deliver the rated power also in the field weakening range, it follows that the EMF of the machine is constant and that the magnetic flux must be reduced in inverse proportion to the rotational speed. Reduction of the magnetic flux as a result of a reduction of the field current is connected with a proportional reduction of the available maximum torque. There are many practical cases for DC machines which manage with a reduced torque, but which require higher rotational speeds than the base speed.

Modern controls for DC motors, therefore, make use of the counter-EMF as a reference quantity for obtaining a ratio between magnetic flux and rotational speed. Being that the magnetic flux and the rotational speed are to give a constant product, a reciprocal relationship results between these two quantities. For the magnetic flux control in the field weakening range, therefore, there results a hyperbolic relationship between magnetic flux and rotational speed, such that with increasing speed the magnetic flux decreases in inverse proportion to the speed.

A control device of this kind is described in U.S. Pat. No. 4,549,122, where this hyperbolic characteristic curve is illustrated in FIG. 7, and which is realized there by means of an analog computation circuit which sets a desired value of the field current inversely proportional to the speed. However, because of the non-linearity of the magnetization characteristic, which may be individually different for each motor, a linear relationship does not exist in reality between the field current and the magnitude of the magnetic flux. This is set forth in column 8 of the U.S. patent, in lines 59 to 68. In FIG. 7, the (idealized) characteristic curve based on a linear relationship between field current and magnetic flux is represented by a bold solid curve. The characteristic adapted to actual requirements, on the other hand, is shown as a dashed curve. The adapted characteristic is obtained by adjusting of resistors (56 and 57 in FIG. 4), which is expressed there by the word "program" (in line 65). This, however, does not involve true programming, but only a shift of the characteristic. Hence only characteristics can be obtained in this way which belong to a given single-parameter family of curves. More specific characteristics, which require several variable parameters for their representation, cannot be obtained by means of the circuit described in U.S. Pat. No. 4,549,122, or only approximately so.

SUMMARY OF THE INVENTION

As DC motors scatter widely with respect to their operating properties and the magnetization characteristics differ from one another even in motors of the same model so that control devices of uniform construction are not always optimally effective even in motors of the same model, the invention has set itself the task for achieving a constant EMF in the field weakening range to create a device for the control of the field current of DC motors wherein a dependence (precontrol characteristic) of the field current on the rotational speed is established by means of a function-forming device, this precontrol characteristic being able to be individually adapted to each motor. According to the invention, this is achieved in that there serves as function-forming device a function memory which contains stored in a matrix in tabulated form values of the control variable for the field correlated to individual speed values, the correlation of these values individually corresponding to the DC motor being established when the DC motor starts up for the first time, and where a constant dependence of the control variable on the speed is established either by a polygonal line obtained by linear interpolation from the value pairs stored in tabulated form or by a curve optimally approximated to these value pairs.

BRIEF DESCRIPTION OF THE DRAWING

An embodiment of the invention is illustrated in the single drawing figure.

DETAILED DESCRIPTION

The DC motor, equipped with the new device according to the invention for control of the field current, is symbolized by its armature 1 and by its field winding 2. For the apportioning of the armature current a first phase angle control device 3 is provided, which is actuated by a drive device 4 for the armature current which need not be described in greater detail. The actual rotational speed of the armature 1 is picked up by a tachogenerator 5, the output signal of which is converted by an analog/digital converter 6 into a digital signal n intended for the subsequent mathematical evaluation, which signal is supplied on the one hand to a function memory 7 and on the other hand to a microprocessor 11. The function memory 7 is a digital memory matrix which establishes a correlation between speed values (n) and setpoint values (A(n)). This memory matrix is actually only a component of the microprocessor 11 and is shown as a separate component of the complete circuit only for the purpose of better comprehension.

In normal operation, the microprocessor 11 receives on the one hand all commands which concern the operation of the DC motor 1, 2 (e.g. desired speed value) and, on the other hand, controls the current supply of the armature 1 via the connected drive device 4 and via the phase angle control device 3 actuated from there. In normal operation, the function memory 7 supplies a control signal A dependent on the actual speed n to a driving or regulating device 8 for the field current which controls a second phase angle control device 9, via which the field winding 2 is supplied with the field current. The task of interpolation between the individual value pairs of the precontrol characteristic present in tabulated form is performed by the microprocessor also. As the control signal A corresponds to the desired field current value, regulating the actual field current value to the given value requires for pickup of the actual field current value a current transformer connected to the driving or regulating device 8, but which is not shown in the drawing.

Besides the control functions occurring in normal operation, the microprocessor 11 fulfills a specific task when the motor 1, 2 starts up for the first time, namely the recording and storing of a characteristic in the function memory 7. After storing in memory is completed, no further altering intervention is made on the function memory 7 by the microprocessor 11, for which reason the action line 11' to the function memory 7 (which actually is a component of the microprocessor 11) is shown in broken lines in the drawing.

As a further aid for the first and only "recording of the characteristic" a sensor 10 determines the counter-EMF of the armature 1, which it calculates on the one hand from the armature voltage and on the other hand from the intensity of the armature current measured with a current transformer 12, supplying the calculated value to the microprocessor 11.

The procedure for the first and only recording of the individual characteristic of the motor 1, 2 into the function memory 7 is as follows:

In the function memory 7 are stored preset values $A_i = A_1, A_2...$ of the control variable A for the drive device 8. The greater the number of these stored values $A_i$ is and the closer they are to each other, the more precise will the individual motor characteristic be. The microprocessor 11 contains a program according to which the values $A_i$ are successively supplied to the input of the driving or regulating device 8 after a certain motor voltage has been applied (for example one half the rated armature voltage). The values $A_i$ are ranged so that there results a successive speed increase.

In general there applies for the EMF of a DC machine the relationship $EMF = k\, MF\, n$, MF denoting the magnetic flux of the DC machine, which itself is a nonlinear function of the field current and hence also of the control variable A. For a certain control variable $A_i$ the ratio EMF to speed n is constant: $EMF/n = k\, MF(A_i)$. In the field weakening range, the EMF of the motor is to be equal to its desired EMF ES. Hence we have for $EMF = ES$: $ES/N_i = k\, MF(A_i)$, where $N_i$ are the speed values of the characteristic to be stored belonging to the $A_i$ values. Hence, for the sought $N_i$ we have $N_i = ES/E_i\, n_i$, where $E_i$ is the EMF occurring at the respective speeds $n_i$ when the values $A_i$ are preset.

Upon application of the first value A1, which corresponds to the desired rated field current value, the field winding 2 is acted upon by a field current which sets the motor 1 in motion at a speed n1, the measuring element 10 delivering at the same time a first value E1 of the EMF. The desired EMF ES is stored in the microprocessor 11 as a fixed value and is made use of for calculating the value $N1 = ES/E1 \times n1$. The value N1 thus calculated, which corresponds to the base speed, is stored in the function memory 7 correlated to the value A1. Then, from the microprocessor 11 the second value A2 (less than A1) of the control variable A is supplied to the drive device 8, which brings about a field current which causes the motor 1 to produce a speed n2 and a counter-EMF E2. From these two values the microprocessor 11 calculates the further value $N2 = ES/E2 \times n2$, which is correlated to the second value A2 of the control variable in the function memory 7. Thereafter, with input of the third value A3 (less than A2) of the control variable A the procedure for the recording of the characteristic is continued, and this until the last value in question of the control variable A has been entered and the respective N value calculated and stored in the function memory 7. At the end of this procedure the function memory 7 contains a table stored in a matrix, of mutually correlated Ai and Ni values which in their totality determine the precontrol characteristic A(n). From the correlated Ai and Ni value pairs a polygonal line can be calculated which contains these value pairs as coordinate values, or a curve of correspondingly high order can be determined which is optimally approximated to these value pairs. This polygonal line or this curve then represents itself the precontrol characteristic A(n), which correlates to any desired speed value n a value A of the control variable. Speed values n which are lower than the base speed N1 have correlated to them the control variable A1 corresponding to the desired rated field current value, for it is only beyond the base speed that the field weakening corresponding to the precontrol characteristic A(n) occurs. As the characteristic is present only in the form of a finite number of individual anchor point pairs, linear interpolation between the individual anchor point pairs is necessary for delivery of the individual A values; the microprocessor assumes this function.

The correlation between the value of the speed n and of the control variable A is always employed in the operation of the motor in the field weakening range for adjustment of the field current in that the respective speed n causes the function memory 7 to deliver the respective control variable A(n) to the driving or regulating device 8, whereby then, by means of the phase angle control 9, exactly that field current is adjusted which precisely at that speed brings about a counter-EMF in the amount of its nominal or desired value.

In the foregoing specification, the invention has been described with reference to an exemplary embodiment thereof. It will, however, be evident that various modifications and changes may be made thereunto without departing from the broader spirit and scope of the invention as set forth in the appended claims. The specification and drawings are, accordingly, to be regarded in an illustrative rather than in a restrictive sense.

What is claimed is:

1. Apparatus for controlling the field current of a DC motor supplied from an AC network, said motor being operated beyond the normal speed of the DC motor in the higher speed range obtainable by weakening of the field of the DC motor, the apparatus comprising a phase angle control circuit for apportioning field current supplied to the DC motor, means for measuring the speed of the DC motor, means for generating a control variable which is a function of the speed of the DC motor coupled to the measuring means and to the apportioning means, said phase angle control circuit being responsive to said control variable, said means for generating comprising a function memory having stored therein value pairs comprising values of the control variable correlated to individual speed values of the DC motor stored in a matrix in tabulated form, and processor means for correlating the values of the control variable to the individual speed values of the DC motor when the DC motor starts up for the first time, said processor means further comprising means for establishing a continuous dependence of the control variable on the speed of the DC motor by at least one of a polygonal line obtained by linear interpolation from the value pairs stored in tabulated form in the function memory or by a curve optimally approximated to said value pairs.

2. A method for controlling the field current of a DC motor supplied from an AC network, said DC motor being operated beyond the normal speed of the DC motor in the higher speed range obtainable by weakening of the field of the DC motor, comprising the steps of apportioning the field current supplied to the DC motor with a phase angle control circuit which is operated in response to a control variable, generating the control variable as a function of the measured speed of the DC motor, correlating values of the control variable to individual speed values of the DC motor by storing in a function memory in tabulated form value pairs comprising values of the control variable and respective individual speed values, said step of correlating comprising correlating the values of the control variable to the individual speed values of the DC motor when the DC motor starts up for the first time, and further comprising establishing a continuous dependence of the control variable on the speed of the DC motor by at least one of a polygonal line obtained by linear interpolation from the value pairs stored in tabulated form or by a curve optimally approximated to said value pairs.

* * * * *